US011293180B2

(12) United States Patent
Okada et al.

(10) Patent No.: US 11,293,180 B2
(45) Date of Patent: Apr. 5, 2022

(54) DECORATIVE BOARD AND METHOD FOR MANUFACTURING SAME

(71) Applicant: AICA KOGYO CO., LTD., Kiyosu (JP)

(72) Inventors: Ayumi Okada, Kiyosu (JP); Masafumi Yamauchi, Kiyosu (JP); Kazuhiro Ishida, Kiyosu (JP); Ryo Inoue, Kiyosu (JP); Kazuki Kajio, Kiyosu (JP); Kazuya Shido, Kiyosu (JP)

(73) Assignee: AICA KOGYO CO., LTD., Kiyosu (JP)

( * ) Notice: Subject to any disclaimer, the term of this patent is extended or adjusted under 35 U.S.C. 154(b) by 0 days.

(21) Appl. No.: 16/488,237

(22) PCT Filed: Feb. 23, 2018

(86) PCT No.: PCT/JP2018/006766
§ 371 (c)(1),
(2) Date: Aug. 22, 2019

(87) PCT Pub. No.: WO2018/155643
PCT Pub. Date: Aug. 30, 2018

(65) Prior Publication Data
US 2019/0383012 A1 Dec. 19, 2019

(30) Foreign Application Priority Data
Feb. 24, 2017 (JP) .............. JP2017-032772

(51) Int. Cl.
E04C 2/284 (2006.01)
B05D 7/00 (2006.01)
(Continued)

(52) U.S. Cl.
CPC ........... E04C 2/284 (2013.01); B05D 7/58 (2013.01); C09D 11/037 (2013.01);
(Continued)

(58) Field of Classification Search
CPC .......... B05D 7/58; B05D 1/42; B05D 3/0254; B05D 3/067; B05D 5/06; B05D 7/576;
(Continued)

(56) References Cited

U.S. PATENT DOCUMENTS

2009/0220709 A1* 9/2009 Horii .................. B41M 5/52
428/32.39

FOREIGN PATENT DOCUMENTS

| JP | H06092756 A | 4/1994 |
|---|---|---|
| JP | 2000071410 A | 3/2000 |

(Continued)

OTHER PUBLICATIONS

Machine Translation of JP 2010-000788A (Year: 2010).*
(Continued)

Primary Examiner — Sathavaram I Reddy
(74) Attorney, Agent, or Firm — Withrow & Terranova, P.L.L.C.; Vincent K. Gustafson

(57) ABSTRACT

A decorative board in the present disclosure includes a primer layer, a concealing layer, a colorant layer and a topcoat layer containing ultraviolet-curable resin on a base material in this order. A method for manufacturing the decorative board in the present disclosure includes a stretching process, an irradiation process, and a separation process. The stretching process includes forming the primer layer, the concealing layer, and the colorant layer on the base material in this order; applying a ultraviolet-curable coating material containing ultraviolet-curable resin; placing a plastic film on the applied ultraviolet-curable coating material, placing a roller on the plastic film, and stretching the ultraviolet-curable coating material by rolling the roller. The irradiation process includes forming the topcoat layer by hardening the
(Continued)

ultraviolet-curable coating material by ultraviolet ray irradiation. The separation process includes separating the plastic film after the irradiation.

16 Claims, 3 Drawing Sheets

(51) Int. Cl.
*C09D 11/037* (2014.01)
*C09D 11/101* (2014.01)
*C09D 11/102* (2014.01)
*C09D 11/107* (2014.01)
*C09D 11/322* (2014.01)
*C09D 11/54* (2014.01)
*E04F 13/08* (2006.01)

(52) U.S. Cl.
CPC .......... *C09D 11/101* (2013.01); *C09D 11/102* (2013.01); *C09D 11/107* (2013.01); *C09D 11/322* (2013.01); *C09D 11/54* (2013.01); *E04F 13/0871* (2013.01); *Y10T 428/24802* (2015.01)

(58) Field of Classification Search
CPC ............ B05D 2203/30; B05D 2252/00; C09D 11/037; C09D 11/101; C09D 11/102; C09D 11/107; C09D 11/322; C09D 11/54; E04C 2/284; E04F 13/0871; E04F 13/0866; Y10T 428/24802; B32B 27/00; B32B 27/40; B44C 5/04; E04B 1/94
See application file for complete search history.

(56) References Cited

FOREIGN PATENT DOCUMENTS

| | | | |
|---|---|---|---|
| JP | 2000246859 | A | 9/2000 |
| JP | 2004339278 | A | 12/2004 |
| JP | 2010000788 | A | 1/2010 |
| JP | 2012072284 | A | 4/2012 |
| JP | 2013052591 | A | 3/2013 |
| JP | 2013226690 | A | 11/2013 |
| TW | 201245350 | A | 11/2012 |
| WO | WO-2014207103 | A1 * | 12/2014 ............... C09D 5/00 |

OTHER PUBLICATIONS

Machine Translation of JP H06-092756A (Year: 1994).*
International Search Report (Form PCT/ISA/210) for International Application No. PCT/JP2018/006766, dated May 22, 2018, 2 pages.
Notification of Transmittal of Copies of Translation of the International Preliminary Report on Patentability (Form PCT/IB/338), International Preliminary Report on Patentability (Form PCT/IB/373), and English Translation of Written Opinion of the International Searching Authority (Form PCT/ISA/237) for International Application No. PCT/JP2018/006766, dated Sep. 6, 2019, 11 pages.
Examination Report for Indian Patent Application No. 201937037865, dated Jun. 22, 2020, 5 pages.
Examination Opinion for Taiwanese Patent Application No. 107106213 dated May 24, 2021, 12 pages including English translation.
Notice of the First Patent Examination Opinion for Chinese Patent Application No. 201880013661.4 dated Feb. 2, 2021, 14 pages including English translation.
Decision of Refusal for Taiwanese Patent Application No. 107106213 dated Sep. 23, 2021, 10 pages including English translation.
Second Office Action for Chinese Patent Application No. 201880013661.4 dated Sep. 6, 2021, 18 pages including English translation.

* cited by examiner (EXAMPLE 1)

(EXAMPLE 31)

(COMPARATIVE EXAMPLE 3)

DECORATIVE BOARD AND METHOD FOR MANUFACTURING SAME

CROSS-REFERENCE TO RELATED APPLICATION

This application is a 35 U.S.C. § 371 national phase filing of International Application No. PCT/JP2018/006766 filed on Feb. 23, 2018 and claims the benefit of Japanese Patent Application No. 2017-032772 filed on Feb. 24, 2017 with the Japan Patent Office, wherein the entire disclosures of the foregoing applications are hereby incorporated by reference herein.

TECHNICAL FIELD

The present disclosure relates to a decorative board and a method for manufacturing the same.

BACKGROUND ART

Decorative boards that have, as their base materials, inorganic boards such as plaster boards and calcium silicate boards, and wooden boards such as plywood, MDFs, and particle boards are conventionally known. Such a decorative board has a poor design property with the base material alone; thus, a decorative layer is made to improve aesthetics of the decorative board by adhering a printed paper on a surface of the decorative board, and the like.

However, use of the printed paper as the decorative layer has caused a problem of poor smoothness of the decorative board since the decorative board picks up uneven texture of the printed paper.

As a solution, conventionally disclosed is a decorative board comprising a decorative layer, formed of a coating material, created on a base material via a base-coating layer, and a clear layer created on the decorative layer, such as those shown in Japanese Unexamined Patent Application Publication No. 2013-226690 and Japanese Unexamined Patent Application Publication No. 2013-052591.

However, the decorative layers of the decorative boards disclosed in Japanese Unexamined Patent Application Publication No. 2013-226690 and Japanese Unexamined Patent Application Publication No. 2013-052591 do not have sufficient visual quality.

PRIOR ART DOCUMENTS

Patent Documents

Patent Document 1: Japanese Unexamined Patent Application Publication No. 2013-226690
Patent Document 2: Japanese Unexamined Patent Application Publication No. 2013-052591

SUMMARY OF THE INVENTION

Desirably, a decorative board and a method for manufacturing the decorative board in the present disclosure have excellent smoothness of a decorative board and excellent visual quality of a decorative layer.

MEANS FOR SOLVING THE PROBLEMS

In one aspect of the present disclosure, a decorative board comprises a primer layer, a concealing layer, a colorant layer, and a topcoat layer containing ultraviolet-curable resin arranged on a base material in this order.

In one aspect of the present disclosure, a method for manufacturing a decorative board comprises a stretching process, an irradiation process, and a separation process. The stretching process comprises forming a primer layer, a concealing layer, and a colorant layer on a base material in this order; subsequently applying an ultraviolet-curable coating material containing ultraviolet-curable resin; and placing a plastic film on a surface of the applied ultraviolet-curable coating material and defoaming the ultraviolet-curable coating material as stretching the ultraviolet-curable coating material by rolling a roller on the plastic film.

The irradiation process comprises forming the topcoat layer by hardening the ultraviolet-curable coating material by irradiating the ultraviolet-curable coating material with ultraviolet ray through the plastic film.

The separation process comprises separating the plastic film after the irradiation.

EFFECTS OF THE INVENTION

The present disclosure provides a decorative board with excellent smoothness, and a decorative layer with fair visual quality.

EXPLANATION OF REFERENCE NUMERALS

Figure 1:
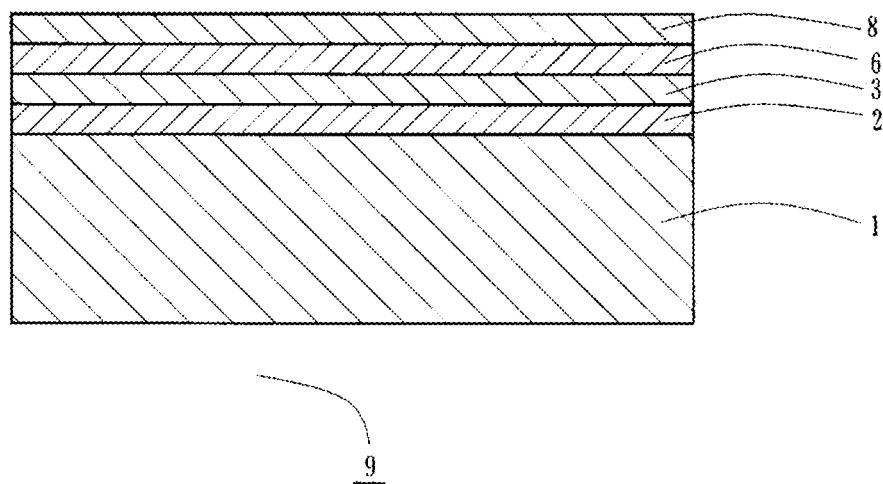
FIG. 1 is a sectional view of a configuration of a decorative board in Example 1 of the present disclosure.

1 . . . base material, 2 . . . primer layer, 3 . . . concealing layer, 4 . . . printed paper, 6 . . . colorant layer, 8 . . . topcoat layer, 9 . . . decorative board, 10 . . . composite board

MODE FOR CARRYING OUT THE INVENTION

An embodiment of the present disclosure will be explained hereinafter in detail.

A decorative board in the present embodiment comprises a primer layer, a concealing layer, a colorant layer, and a topcoat layer containing ultraviolet-curable resin, arranged on a base material in this order.

The decorative board of the present embodiment comprises the colorant layer instead of a printed paper. The decorative board in the present embodiment is therefore excellent in smoothness. If the concealing layer includes urethane resin whose primary component is aliphatic isocyanates, then the decorative board of the present disclosure possesses heat resistance and light resistance required for a decorative board. If the ultraviolet-curable resin in the topcoat layer contains urethane (meth)acrylate, smoothness of the decorative board is further improved.

In a case where the base material is inorganic base material, the decorative board has high flame retardance and high strength, and by using the colorant layer rich in colors and patterns, the decorative board has fair visual quality.

A method for manufacturing the decorative board in the present embodiment comprises a stretching process, an irradiation process, and a separation process. The stretching process comprises forming the primer layer, the concealing layer, and the colorant layer on the base material in this order; subsequently applying an ultraviolet-curable coating material containing the ultraviolet-curable resin; and placing a plastic film on a surface of the applied ultraviolet-curable coating material and defoaming the ultraviolet-curable coating material while stretching the ultraviolet-curable coating material by rolling a roller on the plastic film.

The irradiation process comprises forming the topcoat layer by hardening the ultraviolet-curable coating material by irradiating the ultraviolet-curable coating material with ultraviolet ray through the plastic film.

The separation process comprises separating the plastic film after the radiation.

The method for manufacturing the decorative board in the present embodiment enables manufacturing of the aforementioned excellent decorative board. The decorative board has a variety of finishes by changing types and glossiness of the plastic film. In a case where the base material is inorganic base material, the decorative board has an excellent fire resistance. The ultraviolet-curable coating material is stretched by a rolling movement of the roller. Thus, the topcoat layer and the decorative board can be formed flat. The primer layer and the concealing layer are arranged on the base material; and the colorant layer is arranged on the concealing layer. This arrangement assures that the colorant layer is fixed to the base material. In addition, the color of the base material is concealed with the concealing layer and thus will not appear on the colorant layer. This enables the true color of the colorant layer to be recognizable, which renders good visual quality of the decorative board.

Examples of the base material of the present disclosure include a tabular base material. Preferably, the base material of the present disclosure may include an inorganic base material, a wooden base material, an organic base material, and the like. Examples of the inorganic base material may include cement board, volcanic vitreous multi-layer hoard, calcium silicate board, magnesium silicate board, and magnesium oxide board. Examples of the wooden base material may include plywood, insulation board, MDF (Medium Density Fiberboard), hard board, particle board, and oriented strand board. Examples of the organic base material may include plastic board such as of thermosetting resin and thermoplastic resin; specific examples include phenol resin board, polycarbonate board, acrylic resin board, hard vinyl chloride board, soft vinyl chloride board, polypropylene resin board, polystyrene resin board, and polyethylene terephthalate (PET) resin board. Among these, the inorganic base materials are preferable since the inorganic base materials are excellent in strength and have fire resistance.

A thickness of the base material in the present embodiment is preferably from 1 mm to 120 mm; and in view of the strength and easy-handling of the base material, from 3 mm to 25 mm, or from 3 mm to 20 mm is preferable. A density of the base material is preferably from 0.2 to 2.0 g/cm$^3$, or from 0.5 to 2.0 g/cm$^3$. If the density is within these range, then a primer, which will be mentioned later, is not absorbed into the base material. This makes the decorative board lightweight and easy to handle.

Among the inorganic base materials, the calcium silicate board is particularly preferred since calcium silicate is lightweight and excellent in water resistance, workability, impact resistance, and dimensional stability. Particularly, the calcium silicate board with a thickness from 3 to 12 mm or from 6 to 12 mm has less deflection and thus is easy to handle.

The calcium silicate board is obtained by using slurry, mainly made from a silicate raw material, a calcareous raw material, and a reinforced fiber, into a plate shape by a sheet-making method or a molding method followed by curing and hardening with high-temperature and high-pressure steam in an autoclave. In the sheet-making method, the slurry is made into a sheet with a desired thickness in a wet machine. In the molding method, the slurry is poured into a mold and pressed while being dehydrated. In the present disclosure, the calcium silicate board, which is formed by the sheet-making method, is preferred as it has a strong and stable crystal structure.

In the present embodiment, the primer layer is arranged on a surface of the base material. The primer layer is formed by applying a primer on the surface of the base material. The primer layer contributes to improvement of smoothness of the surface of the base material and prevention of elution of alkaline components from the base material. Examples of the primer used for the primer layer may include isocyanate based resin, chloroprene based rubber, acrylic resin, acrylic emulsion based resin, styrene based resin, acrylic styrene based resin, urethane based resin, epoxy based resin, silicone based resin, nylon resin, alkyd resin, acrylic-modified silicone resin, phenol resin, polyester resin, melamine resin, and alkyl silicate or hydrolytic condensate of alkyl silicate. Preferably, the primer layer includes isocyanurate. The reason is that isocyanurate is superior to isocyanate alone in flame resistance (fire resistance) and heat resistance. In addition, in a case where the base material is inorganic base material, isocyanurate favorably permeates the inorganic base material and adheres to the inorganic base material more tightly.

Particularly preferable examples include aliphatic isocyanurate or alicyclic isocyanurate, which is superior to aromatic isocyanurate in light resistance. Examples of bases for aliphatic isocyanurate include HDI (1,6-hexamethylene diisocyanate); examples of bases for alicyclic isocyanurate include IPDI (isophorone diisocyanate) and H12MDI (dicyclohexylmethane-4,4'-diisocyanate). HDI based aliphatic isocyanurate is particularly preferable. In the present disclosure, HDI based isocyanurate is preferably used as it is non-yellowing, and excellent in light resistance and quick-drying properties.

To form the primer layer, application quantity of the primer is preferably from 10 to 30 g/m$^2$. This range yields an excellent close adhesion of the primer layer with respect to the concealing layer, which will be mentioned later. This range yields an excellent fire resistance of the decorative board in a case where the base material is inorganic base material. This range also yields a fair close adhesion of the primer layer with respect to the base material. Particularly, it yields a fair result of a close adhesion test of the decorative board using a crosscut method. The reason for the fair close adhesion is assumed to be a reaction of the primer layer with the concealing layer. In a case where the concealing layer contains a moisture-curable urethane coating material, which will be mentioned later, the reactivity between the primer layer and the concealing layer is high and the close adhesion between the primer layer and the concealing layer is improved.

In the present embodiment, the concealing layer is formed on a surface of the primer layer. Since the colorant layer is arranged on the surface of the concealing layer, the concealing layer serves as an ink receiving layer that receives an ink contained in the colorant layer.

Preferably, the concealing layer may include a resin material. Examples of the resin material include isocyanate based, chloroprene rubber based, acrylic based, acrylic emulsion based, styrene based, acrylic styrene based, urethane based, epoxy based, and silicone based.

Among these examples, urethane based resin is preferable as the resin material for the concealing layer. Particularly preferable base for the urethane based resin is aliphatic isocyanate or alicyclic isocyanate, which is excellent in light resistance. Aliphatic isocyanate and alicyclic isocyanate are superior to aromatic isocyanate in light resistance. Examples of aliphatic isocyanate include HDI (1,6-hexamethylene diisocyanate); examples of alicyclic isocyanate include IPDI (isophorone diisocyanate) and H12MDI (dicyclohexylmethane-4,4'-diisocyanate). In a case where the concealing layer contains isocyanate, close adhesion between the concealing layer and the colorant layer is improved. It is assumed that isocyanate groups appear on the surface of the concealing layer and chemically bond with the colorant layer.

The primer layer preferably contains aliphatic isocyanurate; and the concealing layer preferably contains aliphatic isocyanate. The primer layer preferably contains HDI based isocyanurate; and the concealing layer preferably contains HDI based isocyanate. This yields fair close adhesion between the concealing layer and the primer layer, and fair light resistance and concealing property of the concealing layer.

HDI is particularly preferable. The concealing layer made from urethane based resin made of HDI has no influence on the colorant layer, which will be mentioned later, and thus is preferable as it shows a good adhesion with the primer layer, and is non-yellowing, and is excellent in light resistance and concealing property. The concealing layer is preferably a reactive hot melt layer. The reactive hot melt layer means a layer that contains a resin material having reactive groups in its molecule.

The resin material for the concealing layer preferably contains urethane resin; more preferably contains moisture-curable urethane resin; and also preferably contains the moisture-curable urethane resin, whose primary component is HDI based isocyanate. The primary component of the moisture-curable urethane resin is urethane resin, and the isocyanate groups react with water contained in an adherent in the air, which causes chain elongation reaction and crosslinking reaction.

Preferably, the concealing layer contains titanium oxide. Concealing property of the concealing layer can be improved by the concealing layer containing white titanium oxide.

Given that the moisture-curable urethane resin is 100% by weight, a fair blending proportion of titanium oxide is 5 to 30% by weight, and a preferable blending proportion of titanium oxide is from 10 to 20% by weight. In this case, the color of the base material is effectively concealed; and the original color of the colorant layer is visible from a surface of the decorative board.

The concealing layer may be arranged directly on the surface of the base material without disposing the primer layer. Also, the primer layer may be arranged directly on the surface of the base material without disposing the concealing layer. However, in these arrangements, the concealing layer or the primer layer cannot absorb unevenness that the surface of the base material originally has, which may lead to decrease smoothness of the surface of the decorative board. In a case where the colorant layer is directly arranged on the primer layer without disposing the concealing layer, the color of the base material appears on the colorant layer; and thus the original color of the colorant layer is made invisible.

By arranging the primer layer and the concealing layer on the surface of the base material in a manner like the decorative board in the present disclosure, the primer layer and the concealing layer absorb the unevenness of the surface of the base material and improve smoothness of the decorative board. In addition, as the color of the base material is concealed with the concealing layer, the original color of the colorant layer is made visible. Accordingly, the decorative board has fair visual quality.

Preferably, a roll coater, a reverse roll coater, a gravure coater, and the like are used as a method of forming the concealing layer. Preferably, the application quantity of the concealing layer is from 20 to 30 $g/m^2$. The concealing layer formed within this application quantity range is not easily permeate through the primer layer and is excellent in concealing property; thus, the color of the base material does not easily appear. In a case where the base material is inorganic base material, fire resistant property of the decorative board improves. In a case where the application quantity is below the lower limit, the resin in the concealing layer permeates through the base material and influences appearance of the surface, due to which the concealing property is prone to be degraded and the color of the base material is prone to appear. In a case where the application quantity exceeds the upper limit, the fire resistant property of the decorative board is prone to be degraded.

The colorant layer is arranged on the concealing layer. The colorant layer contains a colorant. The colorant layer does not include a fibrous base material such as a decorative paper. The colorant layer may have decorative patterns such as of pebbles and wood grains, or may be solid color. The colorant layer may be a print layer or a transfer layer. The print layer can be created directly by gravure printing, flexographic printing, screen printing, inkjet printing, and the like. If the inkjet printing, which is preferable for small quantity production, is used, it wastes less amount of ink and thus is economical. In a case where the print layer is created by the inkjet printing, the ink is preferably a ultraviolet-curable ink. More specifically, an ink, whose primary component is acrylic resin, yields fair close adhesion between the concealing layer and the topcoat layer.

Preferably, the amount of solid content in the print layer in the present disclosure is from 0.1 to 30 $g/m^2$. By having the amount of solid content in the print layer from 0.1 to 30 $g/m^2$, the print layer has fair visual quality.

The transfer layer that can be indirectly created and obtained as the colorant layer is created, for example, by heat transfer using a transfer sheet with ink-printed decorative patterns printed on the surface of a base. Preferably, the amount of solid content in the transfer layer is from 0.1 to 30 $g/m^2$. By having the amount of solid content in the transfer layer from 0.1 to 30 $g/m^2$, creation of the transfer layer by heat transfer is facilitated and the transfer layer has fair visual quality.

The base may include a plastic film, a metallic foil, and the like. Examples of the plastic film that can be used may include polyester film, polyethylene film, polypropylene film, cellophane, diacetyl cellulose film, triacetyl cellulose film, acetyl cellulose butyrate film, polyvinyl chloride film, polyvinylidene chloride film, polyvinyl alcohol film, ethylene vinyl alcohol film, polystyrene film, polycarbonate film, polymethylpentene film, polysulfone film, polyether ketone film, polyether sulfone film, polyetherimide film, polyimide film, fluororesin film, nylon film, and acrylic film. A particularly preferable plastic film is PET (polyethylene terephthalate) film, which is excellent in heat resistance and tensile strength.

Examples of the metallic foil may include gold foil, silver foil, copper foil, zinc foil, indium foil, aluminum foil, tin foil, iron foil (including stainless steel (SUS) foil), and titanium foil.

The topcoat layer is arranged on the colorant layer. The ultraviolet-curable coating material, including the ultraviolet-curable resin, is applied on the colorant layer to form the topcoat layer. In the present embodiment, the ultraviolet-curable resin includes photopolymerizable oligomer, photopolymerizable monomer, and photopolymerization initiator. The ultraviolet-curable coating material has the ultraviolet-curable resin with additions such as a solvent and an additive. The application quantity of the ultraviolet-curable coating material in terms of solid content is preferably from 65 to 200 g/m$^2$, and more preferably from 65 to 150 g/m$^2$ (conversion to dried coating thickness: from 65 to 150 μm). As the application quantity increases, the wear resistance of the decorative board increases.

The ultraviolet-curable resin used in the ultraviolet-curable coating material may include urethane (meth)acrylate as photopolymerizable oligomer. The ultraviolet-curable resin in the topcoat layer preferably includes urethane acrylate oligomer and (meth)acrylate monomer. The ultraviolet-curable resin preferably includes urethane (meth)acrylate alone, and more preferably includes one or more kinds of mono-functional to tri-functional (meth)acrylate as photopolymerizable monomer, and additionally mixed with photopolymerization initiator. The topcoat layer that includes such a ultraviolet-curable resin becomes a hardened coating that is resilient and excellent in wear resistance and fast curability. The wear resistance of the topcoat layer is further improved when urethane (meth)acrylate is used in mixture with mono-functional to tri-functional (meth)acrylate compared with when urethane (meth)acrylate is used alone.

The urethane (meth)acrylate is an oligomer containing acrylic group, and urethane bond produced by reaction between isocyanate group and hydroxy group. The urethane (meth)acrylate is synthesized through urethanization reaction of polyisocyanate component with hydroxyl group-containing (meth)acrylate compound or polyol component. The urethane (meth)acrylate is curable with ultraviolet ray as it contains acrylic group at a terminal of its molecular chain.

In the present disclosure, preferably, the topcoat layer contains bi- to tri-functional urethane (meth)acrylate. In this case, the decorative board has fair wear resistance; the topcoat layer has a little shrinkage; the topcoat layer has no cracks after hardening of the ultraviolet-curable coating material; and the decorative board has excellent formability, a capability of uniform application of a coating material, and an excellent appearance.

Preferably, the ultraviolet-curable resin in the present disclosure contains tri-functional urethane acrylate and (meth)acrylate in solid content. In this case, smoothness of the decorative board is further improved. A blending ratio of tri-functional urethane acrylate to mono- to tri-functional (meth)acrylate in solid content is preferably as follows: tri-functional urethane acrylate:mono- to tri-functional (meth)acrylate=100 parts by weight:60 to 120 parts by weight. If the blending ratio is 100 parts by weight:62 to 112 parts by weight (60 to 80 parts by weight:70 to 50 parts by weight), the decorative board has fair smoothness. Particularly preferable range of blending ratio is 100 parts by weight:84 to 112 parts by weight (60 to 70 parts by weight: 70 to 60 parts by weight). In addition, when mono-functional (meth)acrylate and tri-functional (meth)acrylate are used together, and when the blending ratio of mono-functional (meth)acrylate:tri-functional (meth)acrylate in solid content is preferably 100 parts by weight:600 parts by weight, and more preferably 100 parts by weight:14 to 140 parts by weight (25 to 35 parts by weight:35 to 5 parts by weight), the topcoat layer and the decorative board have fair evaluation results.

The decorative board has fair smoothness when containing 5 to 100 parts by weight or, more preferably, 5 to 65 parts by weight of mono-functional (meth)acrylate; 20 to 110 parts by weight or, more preferably, 25 to 50 parts by weight of bi-functional (meth)acrylate; and 30 to 110 parts by weight of tri-functional (meth)acrylate with respect to 100 parts by weight of urethane (meth)acrylate. Particularly preferably, the decorative board has excellent smoothness, light resistance, and wear resistance when containing 70 to 120 parts by weight of mono-functional to tri-functional (meth)acrylate in total with respect to 100 parts by weight of urethane (meth)acrylate.

Urethane (meth)acrylate included in the ultraviolet-curable resin preferably has 1 to 300% elongation, more preferably 3 to 10% and 4 to 10% elongation. Conditions to measure the elongation was as follows: a coating film having a film thickness of 100 μm was created from 100 parts of urethane (meth)acrylate and 3 parts of photopolymerization initiator IRGACURE 184 (1-hydroxy-cyclohexyl-phenyl-ketone: manufactured by BASF SE) with irradiation by a high pressure mercury lamp with irradiation intensity of 600 mJ/cm$^2$, and rupture elongation was measured with TENSILON universal testing instrument ORIENTEC RTC-1225A, manufactured by A & D Company, Limited, in accordance with JIS K 7127:1999. The width of a test piece was 10 mm, the length of the test piece was 150 mm, and tension speed was 5 mm/min, in the present disclosure, the ultraviolet-curable resin has less shrinkage, has no cracks on the hardened coating, and is excellent in formability when the elongation of urethane (meth)acrylate is 3 to 10%, and even narrowed to 4% or more and 10% or less. The ultraviolet-curable coating material can be uniformly applied, and the topcoat layer has an excellent appearance.

To form the topcoat layer, the ultraviolet-curable resin may be diluted with a solvent so that the viscosity is 100 to 3000 mPa·s, or preferably 1100 to 1500 mPa·s when the liquid temperature of the ultraviolet-curable resin is 23° C. Examples of the solvent may include toluene, butyl acetate, isobutanol, ethyl acetate, cyclohexane, cyclohexanone, methylcyclohexanone, hexane, acetone, methyl ethyl ketone, methyl isobutyl ketone, and propylene glycolmonomethyl ether. The device for measuring the viscosity is BII viscometer manufactured by Toki Sangyo Co., Ltd. The rotor used for the measurement is No.2, No.3, or No.4 with a rotational speed of 60 rpm. In the present disclosure, the ultraviolet-curable coating material has an excellent formability and is capable of uniform application, and the resulting topcoat layer has an excellent appearance when the viscosity of the ultraviolet-curable coating material is 1100 to 1500 mPa·s.

Examples of the mono-functional (meth)acrylate contained in the ultraviolet-curable resin may include methyl (meth)acrylate, ethyl (meth)acrylate, methoxy triethylene glycol (meth)acrylate, n-propyl (meth)acrylate, i-propyl (meth)acrylate, n-butyl (meth)acrylate, i-butyl (meth)acrylate, t-butyl (meth)acrylate, 2-methyl butyl (meth)acrylate, n-pentyl (meth)acrylate, n-hexyl (meth)acrylate, n-heptyl (meth)acrylate, 2-methyl hexyl (meth)acrylate, 2-ethyl hexyl (meth)acrylate, 2-butyl hexyl (meth)acrylate, isooctyl (meth)acrylate, isopentyl (meth)acrylate, isononyl (meth) acrylate, isodecyl (meth)acrylate, cyclohexyl (meth)acrylate, benzyl (meth)acrylate, phenoxy (meth)acrylate, n-nonyl (meth)acrylate, n-decyl (meth)acrylate, lauryl (meth)acrylate, hexadecyl (meth)acrylate, and stearyl (meth)acrylate, Examples of the bi-functional (meth)acrylate may include bisphenol F-EO modified di(meth)acrylate, bisphenol A-EO modified di(meth)acrylate, polypropylene glycol di(meth)acrylate, polyethylene glycol (meth)acrylate, tricyclodecanedimethylol di(meth)acrylate, dicyclopentadiene (meth)acrylate, and polyethylene glycol #300 diacrylate.

Examples of the tri-functional (meth)acrylate may include trimethylolpropane tri(meth)acrylate, trimethylolpropane PO modified tri(meth)acrylate, trimethylolpropane EO modified tri(meth)acrylate, tris(2-hydroxyethyl)isocyanurate tri(meth)acrylate, pentaerythritol tri(meth)acrylate, pentaerythritol EO modified tri(meth)acrylate, EO modified glycerin tri (meth)acrylate, propoxylated(3)glyceryl tri (meth)acrylate, high-propoxylated(5.5)glyceryl tri(meth) acrylate, and tris(acroxy ethyl)isocyanurate.

The ultraviolet-curable resin contains a photopolymerization initiator. Considering curability of the coating material, light stability, compatibility with the coating material, low volatility, and low odorousness, the photopolymerization initiator is preferably alkylphenone based photopolymerization initiator or acylphosphine oxide based photopolymerization initiator, commercial products of which include IRGACURE 127, 184, 369E, 379, 907, 2959, and 1173. Examples of the acylphosphine oxide based photopolymerization initiator include IRGACURE 819, and TPO (a product name, manufactured by BASF Japan Ltd.). The blend ratio of the photopolymerization initiator is 0.5 to 5 parts by weight in solid content with respect to 100 parts by weight of urethane (meth)acrylate. IRGACURE is a registered trademark.

A method of forming the topcoat layer is as follows: the ultraviolet-curable coating material is applied on the colorant layer with the roll coater; thus coated surface is covered with a plastic film; the ultraviolet-curable coating material is defoamed while being stretched and flattened by rolling the roller on the plastic film; the ultraviolet-curable coating material is hardened with ultraviolet ray irradiation from above the plastic film; and the plastic film is separated. Preferably, the roller is a rubber roller. The rubber roller has elasticity, which helps efficient defoaming. Coating with the plastic film blocks the air, which enables the ultraviolet ray irradiation with no air and reduces inhibition to cure the ultraviolet-curable coating material.

To avoid a crease on the plastic film when rolling the roller on the plastic film, it is preferable to attach the plastic film to a frame in advance, then place the plastic film on the ultraviolet-curable coating material, and defoam the ultraviolet-curable coating material while stretching the ultraviolet-curable coating material uniformly with the roller.

Examples of materials of the plastic film ay include polyesters such as polyethylene terephthalate and polybutylene terephthalate, and polyolefins such as polyethylene and polypropylene, polyamides such as nylon 6 and nylon 12, and polyvinyl alcohol. Among these, particularly preferable material is PET (polyethylene terephthalate) that is excellent in heat resistance and tensile strength.

The flattened ultraviolet-curable coating material is hardened with the ultraviolet ray irradiation. When irradiating ultraviolet ray, ultraviolet ray having an energy of 100 to 800 mJ/cm$^2$ with a wavelength range of 100 to 500 nm, preferably 100 to 400 nm and 200 to 400 nm, is irradiated by using a low pressure mercury lamp, a high pressure mercury lamp, an extra-high pressure mercury lamp, a xenon lamp, a carbon arc, a metal halide lamp, an LED lamp, and the like. A device for measuring the illumination intensity is product number UIT-250, manufactured by USHIO INC. A lens used for the measurement is a 365 nm lens, or a 405 nm lens.

As a result of separating the plastic film after the ultraviolet-curable resin is hardened, the decorative board in the present disclosure can be obtained. An arithmetic average roughness Ra of the topcoat layer is favorably 0.10 μm or less, and preferably 0.05 μm or less. In this case, the decorative board has a better visual quality. The arithmetic average roughness Ra of the topcoat layer is also the arithmetic average roughness Ra of the decorative board. The arithmetic average roughness is measured based on JIS B 0601:2001.

EXAMPLE 1

As shown in FIG. 1, the decorative board 9 in Example 1 comprises the primer layer 2, the concealing layer 3, the colorant layer 6, and the topcoat layer 8 containing the ultraviolet-curable resin formed in this order on the base material 1.

The decorative board 9 was manufactured in accordance with the following procedure.

Forming of Primer Layer

The primer layer was formed by applying an isocyanate based primer, whose primary component is HDI based isocyanurate, which contains 90% by mass of HDI based isocyanurate (product name: Aica-Aibon, AE-128E1 NCO content (isocyanate content): approximately 21% by weight, manufactured by AICA Kogyo Co., Ltd.) and 10% by mass of propylene carbonate mixed for viscosity adjustment, on a surface of a 6 mm-thick calcium silicate board with the roll coater so that the solid content after drying was 20 g/m$^2$ and drying the primer with hot air.

Forming of Concealing Layer

The concealing layer was formed by applying a moisture-curable urethane coating material containing titanium dioxide (one-component moisture-curable urethane coating material VP9383/470 manufactured by KLEIBERIT M. G. Becker GmbH & Co. KG, containing HDI based isocyanate as the primary component and including 15% by mass of titanium dioxide) on the surface of the primer layer with the reverse roll coater so that the solid content after drying was 30 g/m$^2$ and drying the coating material.

Forming of Colorant Layer

Next, stone patterns were printed on the surface of the concealing layer by inkjet printing using a ultraviolet-curable ink containing acrylic resin as the primary component and including a pigment and a solvent so that the application quantity was 10 g/m$^2$. The colorant layer was formed by irradiating ultraviolet ray on the patterns with the metal halide lamp so that the irradiation intensity was 600 mJ/cm$^2$.

Forming of Topcoat Layer

Note that part by weight is a value in solid content.

The ultraviolet-curable coating material was obtained by mixing 42.9 parts by weight of mono-functional acrylate (methoxy triethylene glycol acrylate; product name: ME-3; manufactured by DKS Co. Ltd.) as a photopolymerizable monomer, 42.9 parts by weight of tri-functional acrylate (tris(acryloxy ethyl)isocyanurate; product name: GX-8430; manufactured by DKS Co. Ltd.) as a photopolymerizable monomer, and 1.4 parts by weight of IRGACURE TPU (manufactured by BASF Japan Ltd. 2,4,6-trimethyl benzoyl-diphenyl-phosphine oxide) as a photopolymerization initiator with respect to 100 parts by weight of tri-functional urethane acrylate (60 to 70% of urethane acrylate composition; approximately 30% of acrylic acid ester composition; 1 to 10% of acrylic acid 2-hydroxy propyl; several tenths of a percent of organic solvent; product name: NEW FRONTIER R-1302XT; NEW FRONTIER is a registered trademark; 5% elongation; manufactured by DKS Co. Ltd.) as a photopolymerizable oligomer, followed by adding methyl isobutyl ketone in the mixture and by adjusting the mixture so that the viscosity was 1300 mPa·s when the temperature of the mixture was 23° C. and the rotor was No.3 with the rotational speed of 60 rpm.

Next, the topcoat layer was formed by applying the ultraviolet-curable coating material on the colorant layer with the roll coater so that the application quantity of the ultraviolet-curable coating material after the hardening was 80 g/m$^2$ in solid content (conversion to dried film thickness: 80 μm), placing a PET film, which was attached to a frame, on the coated surface and stretching and flattening the ultraviolet-curable coating material while defoaming by rolling the rubber roller; and then hardening the ultraviolet-curable coating material by irradiating ultraviolet ray from above the PET film with the metal halide lamp so that the irradiation intensity was 450 mJ/cm$^2$. The decorative board was obtained by separating the PET film from the topcoat layer after the ultraviolet-curable coating material was hardened.

EXAMPLE 2

The decorative board was manufactured in the same manner as in Example 1 other than that the application quantity of the primer was 10 g/m$^2$.

EXAMPLE 3

The decorative board was manufactured in the same manner as in Example 1 other than that the application quantity of the primer was 30 g/m$^2$.

EXAMPLE 4

The decorative board was manufactured in the same manner as in Example 1 other than that the application quantity of the moisture-curable urethane coating material containing titanium dioxide was 20 g/m$^2$.

EXAMPLE 5

The decorative board was manufactured in the same manner as in Example 1 other than that the application quantity of the moisture-curable urethane coating material containing titanium dioxide was 25 g/m$^2$.

EXAMPLE 6

The decorative board was manufactured in the same manner as in Example 1 other than that the mono-functional acrylate was 35.7 parts by weight, and the tri-functional acrylate was 50.0 parts by weight in manufacturing of the topcoat layer.

EXAMPLE 7

The decorative board was manufactured in the same manner as in Example 1 other than that the mono-functional acrylate was 50.0 parts by weight and the tri-functional acrylate was 35.7 parts by weight in forming the topcoat layer.

EXAMPLE 8

The decorative board was manufactured in the same manner as in Example 1 other than that the mono-functional acrylate was 37.5 parts by weight, try-functional acrylate was 37.5 parts by weight, and IRGACURE TPO was 1.5 parts by weight in forming the topcoat layer.

EXAMPLE 9

The decorative board was manufactured in the same manner as in Example 1 other than that the mono-functional acrylate was 35.7 parts by weight, the tri-functional acrylate was 35.7 parts by weight, and IRGACURE TPO was 1.5 parts by weight in forming the topcoat layer.

EXAMPLE 10

The decorative board was manufactured in the same manner as in Example 1 other than that the mono-functional acrylate was 58.3 parts by weight, the tri-functional acrylate was 58.3 parts by weight, and IRGACURE TPO was 1.6 parts by weight in forming the topcoat layer.

EXAMPLE 11

The decorative board was manufactured in the same manner as in Example 1 other than that the mono-functional acrylate was 53.8 parts by weight, the tri-functional acrylate was 53.8 parts by weight, IRGACURE TPO was 1.6 parts by weight in forming the topcoat layer.

EXAMPLE 12

The decorative board was manufactured in the same manner as in Example 1 other than that the tri-functional acrylate was not blended, 100 parts by weight of the mono-functional acrylate was blended, and IRGACURE TPO was 1.5 parts by weight in forming the topcoat layer.

EXAMPLE 13

The decorative board was manufactured in the same manner as in Example 12 other than that 100 parts by weight of a bi-functional acrylate (polyethylene glycol #300 diacrylate; product name: NEW FRONTIER PE-300; NEW FRONTIER is a registered trademark; manufactured by DKS Co. Ltd.) was blended in place of the mono-functional acrylate in forming the topcoat layer.

EXAMPLE 14

The decorative board was manufactured in the same manner as in Example 12 other than that 100 parts by weight of the tri-functional acrylate was blended in place of the mono-functional acrylate in forming the topcoat layer.

EXAMPLE 15

The decorative board was manufactured in the same manner as in Example 1 other than that the colorant layer was formed by transferring stone patterns with a hot pinch roll heated at 180° C. using a transfer film having stone patterns, whose primary components are acrylic based resin, vinyl chloride/vinyl acetate copolymer resin, and a pigment (manufactured by Chiyoda Gravure Corporation; amount of solid content of the print layer was approximately 5 g/m$^2$; base film was a mold-release treated 25 μm-thick polyethylene terephthalate film).

EXAMPLE 16

The decorative board was manufactured in the same manner as in Example 1 other than that a 5.5 mm-thick MDF was used in place of the 6 mm-thick calcium silicate board.

The decorative board in Example 16 was slightly inferior in concealing property of the concealing layer compared to the decorative board whose base material was a calcium silicate board. Since the base material of the decorative board in Example 16 was a wooden base material, fire resistance was not evaluated.

EXAMPLE 17

The decorative board was manufactured in the same manner as in Example 1 other than that a tri-functional urethane acrylate (60 to 70% of urethane acrylate composition; approximately 30% of alkanediol diacrylate; 1 to 10% of acrylic acid 2-hydroxy propyl; product name: R-1304; 10% elongation; manufactured by DKS Co. Ltd.) was used in place of the tri-functional urethane acrylate (product name: R-1302XT; manufactured by DKS Co. Ltd.) in forming the topcoat layer.

EXAMPLE 18

The decorative board was manufactured in the same manner as in Example 1 other than that a bi-functional urethane acrylate (approximately 70% of urethane acrylate composition; approximately 30% of acrylic acid ester composition; product name: R-1216; 4% elongation; manufactured by DKS Co. Ltd.) was used in place of the tri-functional urethane acrylate (product name: R-1302XT; manufactured by DKS Co. Ltd.) in forming the topcoat layer.

EXAMPLE 19

The decorative board was manufactured in the same manner as in Example 1 other than that a mono-functional acrylate (acryloylmorpholine; product name: ACMO; manufactured by KJ Chemicals Corporation) was used in place of the mono-functional acrylate (methoxy triethylene glycol acrylate; product name: ME-3; manufactured by DKS Co. Ltd.) in forming the topcoat layer.

EXAMPLE 20

The decorative board was manufactured in the same manner as in Example 1 other than that a mono-functional acrylate (ethylene oxide modified nonyl phenol acrylate; product name: NP-1; manufactured by DKS Co. Ltd.) was used in place of the mono-functional acrylate (methoxy triethylene glycol acrylate; product name: ME-3; manufactured by DKS Co. Ltd.) in forming the topcoat layer.

EXAMPLE 21

The decorative board was manufactured in the same manner as in Example 1 other than that a bi-functional acrylate (1,6-hexanediol diacrylate; product name: HDDA; manufactured by DKS Co. Ltd.) was used in place of the mono-functional acrylate (methoxy triethylene glycol acrylate; product name: ME-3; manufactured by DKS Co. Ltd.) in forming the topcoat layer.

EXAMPLE 22

The decorative board was manufactured in the same manner as in Example 1 other than that a bi-functional acrylate (hydroxypivalic acid neopentylglycol diacrylate; product name: HPN; manufactured by DKS Co. Ltd.) was used in place of the mono-functional acrylate (methoxy triethylene glycol acrylate; product name: ME-3; manufactured by DKS Co. Ltd.) in forming the topcoat layer.

EXAMPLE 23

The decorative board was manufactured in the same manner as in Example 1 other than that a pentaerythritol triacrylate (product name: PET-3; manufactured by DKS Co. Ltd.) was used as the tri-functional acrylate in place of the tri-functional acrylate (tris(acryloxy ethyl)isocyanurate; product name: GX-8430, manufactured by DKS Co. Ltd.) in forming the topcoat layer.

EXAMPLE 24

The decorative board was manufactured in the same manner as in Example 1 other than that a trimethylolpropane triacrylate (product name: TMPT; manufactured by DKS Co. Ltd.) was used as the tri-functional acrylate in place of the tri-functional acrylate (tris(acryloxy ethyl)isocyanurate; product name: GX-8430; manufactured by DKS Co. Ltd.) in forming the topcoat layer.

EXAMPLE 25

The decorative board was manufactured in the same manner as in Example 1 other than that 8.3 parts by weight of the mono-functional acrylate (methoxy triethylene glycol acrylate; product name: ME-3; manufactured by DKS Co. Ltd.), 25 parts by weight of the bi-functional acrylate (1,6-hexanediol diacrylate; product name: HDDA; manufactured by DKS Co. Ltd.), parts by weight of the tri-functional acrylate (tris(acryloxy ethyl)isocyanurate; product name: GX-8430; manufactured by DKS Co. Ltd.), and 1.6 parts by weight of IRGACURE TPO was used with respect to 100 parts by weight of the tri-functional urethane acrylate (product name: R-1302XT; manufactured by DKS Co. Ltd.) in forming the topcoat layer.

EXAMPLE 26

The decorative board was manufactured in the same manner as in Example 1 other than that the ultraviolet-curable coating material was applied so that the application quantity of the ultraviolet-curable coating material was 150 g/m² in solid content.

EXAMPLE 27

The decorative board was manufactured in the same manner as in Example 1 other than that the application quantity of the ultraviolet-curable coating material was 65 g/m² in solid content.

EXAMPLE 28

The decorative board was manufactured in the same manner as in Example 1 other than that IRGACURE 184 (1-hydroxy-cyclohexyl-phenyl-ketone; manufactured by BASF SE) was used as a photopolymerization initiator in place of IRGACURE TPO (2,4,6-trimethyl benzoyl-diphenyl-phosphine oxide; manufactured by BASF SE) in forming the topcoat layer.

EXAMPLE 29

The decorative board was manufactured in the same manner as in Example 1 other than that IRGACURE 819 (bis(2,4,6-trimethyl benzoyl)-phenylphosphine oxide manufactured by BASF SE) was used as a photopolymerization initiator in place of IRGACURE TPO (2,4,6-trimethyl benzoyl-diphenyl-phosphine oxide; manufactured by BASF SE) in forming the topcoat layer.

EXAMPLE 30

The decorative board was manufactured in the same manner as in Example 25 other than that the LED lamp (irradiation intensity: 500 mJ/cm²) was used for the irradiation in place of the metal halide lamp in forming the topcoat layer.

EXAMPLE 31

The decorative board was manufactured in the same manner as in Example 1 other than that 100 parts by weight of the tri-functional urethane acrylate (product name: R-1302XT; manufactured by DKS Co. Ltd.) and 1.4 parts by weight of IRGACURE TPO were used without using mono- to tri-functional acrylates in forming the topcoat layer. The ultraviolet-curable coating material did not stretch well when being flattened with the roller; and the decorative board was slightly inferior in smoothness.

EXAMPLE 32

The decorative board was manufactured in the same manner as in Example 1 other than that a chloroprene rubber based primer (product number: RA-910; manufactured by AICA Kogyo Co., Ltd.) was used as the primer layer in place of the HDI based isocyanurate.

EXAMPLE 33

The decorative board was manufactured in the same manner as in Example 1 other than that an acrylic styrene based primer (product number: Ultrasol A-40; manufactured by AICA Kogyo Co., Ltd.) was used as the primer layer in place of the HDI based isocyanurate.

COMPARATIVE EXAMPLE 1

An attempt was made to obtain the decorative board of Example 1 by using an isocyanate based primer whose primer component was MDI based isocyanurate (diphenylmethane based aromatic isocyanurate; manufactured by Think Chemical industries Co., Ltd.; TN-100) in place of the HDI based isocyanurate as the primer layer without disposing the concealing layer and the topcoat layer. The resulting decorative board was inferior in light resistance and heat resistance as the primer layer.

COMPARATIVE EXAMPLE 2

An attempt was made to obtain the decorative board of Example 1 by using MDI based isocyanate (aromatic isocyanate based on diphenyl-methane; manufactured by KLEIBERIT; Reactive HotMelt PUR 706.1) in place of the HDI based isocyanate as the concealing layer without disposing the topcoat layer. The resulting decorative board was inferior in light resistance and concealing property as the concealing layer.

COMPARATIVE EXAMPLE 3

Figure 2:
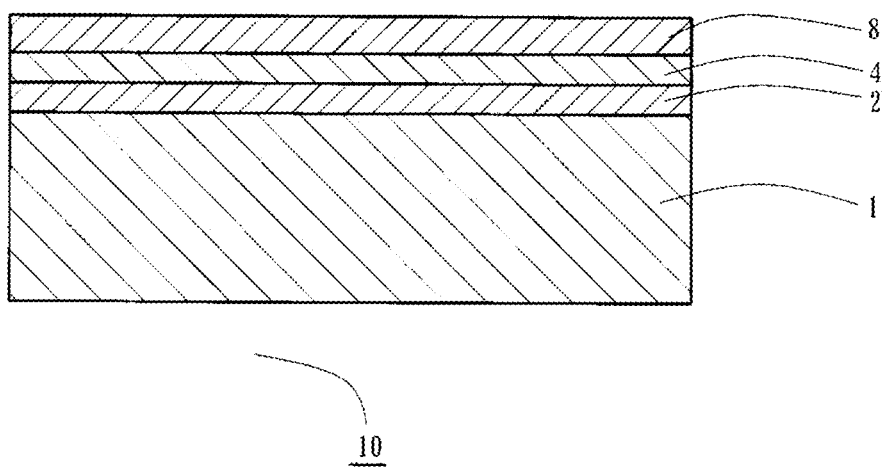
FIG. 2 is a sectional view of a configuration of a composite board in Comparative Example 3.

As shown in FIG. 2, a composite board 10 in a comparative example 3 comprises the primer layer 2, a printed paper 4, and the topcoat layer 8 containing the ultraviolet-curable resin in this order on the base material 1.

The composite board was manufactured in the same manner as in the decorative board of Example 1 other than that a printed paper (basis weight: 40 g/m²) was used in place of the colorant layer.

The composite board of comparative example 3 failed in fire resistance test and could not be formed smoothly as it picked up unevenness of the printed paper.

COMPARATIVE EXAMPLE 4

An attempt was made to obtain a composite board in the same manner as the decorative board of Example 1 other than that a printed paper (basis weight: 100 g/m²) was used in place of the colorant layer. Due to a poor permeation of the ultraviolet-curable resin to the printed paper, separation occurred after forming in a portion where the printed paper was disposed, and thus the composite board could not be obtained.

COMPARATIVE EXAMPLE 5

The composite board was manufactured in the same manner as the decorative board of Example 1 other than that the primer layer was not formed.

In the composite board of comparative example 5, close adhesion of the base material with the concealing layer decreased. In addition, the composite board was inferior in smoothness as it picked up unevenness of the base material (substrate).

COMPARATIVE EXAMPLE 6

The composite board was manufactured in the same manner as the decorative board of Example 1 other than that the concealing layer was not formed.

In the composite board of comparative example 6, close adhesion of the primer layer with the print layer and of the print layer with the topcoat layer decreased. In addition, the composite board was inferior in concealing property as it picked up the color of the base material. Furthermore, the composite board was inferior in smoothness as the ultraviolet-curable resin foamed due to unevenness on the base material when the topcoat layer was flattened with the roller. Table 1 to Table 8 show the evaluation results.

TABLE 1

|  |  | Example 1 | Example 2 | Example 3 | Example 4 | Example 5 |
|---|---|---|---|---|---|---|
|  | Base Material | Calcium Silicate Board | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate | Aliphatic Isocyanurate |
|  | Application Quantity | 20 g/m² | 10 g/m² | 30 g/m² | 20 g/m² | 20 g/m² |
| Evaluation | Light Resistance | ○ | ○ | ○ | ○ | ○ |
|  | Heat Resistance | ○ | ○ | ○ | ○ | ○ |
|  | Close Adhesion | ○ | ○ | ○ | ○ | ○ |
| Concealing Layer | Type | Aliphatic Isocyanate | Aliphatic Isocyanate | Aliphatic Isocyanate | Aliphatic Isocyanate | Aliphatic Isocyanate |
|  | Application Quantity | 30 g/m² | 30 g/m² | 30 g/m² | 20 g/m² | 25 g/m² |
| Evaluation | Light Resistance | ○ | ○ | ○ | ○ | ○ |
|  | Concealing Property | ○ | ○ | ○ | ○ | ○ |
|  | Coatability | ○ | ○ | ○ | ○ | ○ |
|  | Colorant Layer | Inkjet Printing | Inkjet Printing | Inkjet Printing | Inkjet Printing | Inkjet Printing |
| Topcoat Layer | Urethane Acrylate | 100 | 100 | 100 | 100 | 100 |
|  | Mono-Functional Acrylate | 42.9 | 42.9 | 42.9 | 42.9 | 42.9 |
|  | Bi-Functional Acrylate | — | — | — | — | — |
|  | Tri-Functional Acrylate | 42.9 | 42.9 | 42.9 | 42.9 | 42.9 |
|  | Total Monomer | 85.7 | 85.7 | 85.7 | 85.7 | 85.7 |
|  | Photopolymerization Initiator | 1.4 | 1.4 | 1.4 | 1.4 | 1.4 |
|  | Type of Photopolymerization Initiator | Irg. TPO | Irg. TPO | Irg. TPO | Irg. TPO | Irg. TPO |
|  | Application Quantity | 80 g/m² | 80 g/m² | 80 g/m² | 80 g/m² | 80 g/m² |
|  | Lamp Used | Metal Halide | Metal Halide | Metal Halide | Metal Halide | Metal Halide |
| Evaluation of Topcoat Layer | Close Adhesion with Concealing Layer | ○ | ○ | ○ | ○ | ○ |
|  | Heat Resistance | ○ | ○ | ○ | ○ | ○ |
| Evaluation of Decorative Board | Smoothness | ○ | ○ | ○ | ○ | ○ |
|  | Fire Resistance | ○ | ○ | ○ | ○ | ○ |
|  | Heat Resistance | ○ | ○ | ○ | ○ | ○ |
|  | Light Resistance | ○ | ○ | ○ | ○ | ○ |
|  | Wear Resistance (times) | 220 | 220 | 220 | 220 | 220 |
|  | Arithmetic Average Roughness Ra (μm) | 0.04 | 0.04 | 0.05 | 0.04 | 0.05 |
|  | Close Adhesion with Tabular Base Material | ◎ | ◎ | ◎ | ◎ | ◎ |

Irg.TPO in Table 1 stands for IRGACURE TPO.

TABLE 2

|  |  | Example 6 | Example 7 | Example 8 | Example 9 |
|---|---|---|---|---|---|
|  | Base Material | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate |
|  | Application Quantity | 20 g/m² | 20 g/m² | 20 g/m² | 20 g/m² |
| Evaluation | Light Resistance | ○ | ○ | ○ | ○ |
|  | Heat Resistance | ○ | ○ | ○ | ○ |
|  | Close Adhesion | ○ | ○ | ○ | ○ |
| Concealing Layer | Type | Aliphatic Isocyanate | Aliphatic Isocyanate | Aliphatic Isocyanate | Aliphatic Isocyanate |
|  | Application Quantity | 30 g/m² | 30 g/m² | 30 g/m² | 30 g/m² |
| Evaluation | Light Resistance | ○ | ○ | ○ | ○ |
|  | Concealing Property | ○ | ○ | ○ | ○ |
|  | Coatability | ○ | ○ | ○ | ○ |
|  | Colorant Layer | Inkjet Printing | Inkjet Printing | Inkjet Printing | Inkjet Printing |
| Topcoat Layer | Urethane Acrylate | 100 | 100 | 100 | 100 |
|  | Mono-Functional Acrylate | 35.7 | 50.0 | 37.5 | 35.7 |
|  | Bi-Functional Acrylate | — | — | — | — |
|  | Tri-Functional Acrylate | 50.0 | 35.7 | 37.5 | 35.7 |
|  | Total Monomer | 85.7 | 85.7 | 75.0 | 71.4 |
|  | Photopolymerization Initiator | 1.4 | 1.4 | 1.5 | 1.5 |

TABLE 2-continued

|  |  | Example 6 | Example 7 | Example 8 | Example 9 |
|---|---|---|---|---|---|
|  | Type of Photopolymerization Initiator | Irg. TPO | Irg. TPO | Irg. TPO | Irg. TPO |
|  | Application Quantity | 80 g/m² | 80 g/m² | 80 g/m² | 80 g/m² |
| Lamp Used |  | Metal Halide | Metal Halide | Metal Halide | Metal Halide |
| Evaluation of Topcoat Layer | Close Adhesion with Concealing Layer | ○ | ○ | ○ | ○ |
|  | Heat Resistance | ○ | ○ | ○ | ○ |
| Evaluation of Decorative Board | Smoothness | ○ | ○ | ○ | ○ |
|  | Fire Resistance | ○ | ○ | ○ | ○ |
|  | Heat Resistance | ○ | ○ | ○ | ○ |
|  | Light Resistance | ○ | ○ | ○ | ○ |
|  | Wear Resistance (times) | 211 | 214 | 209 | 210 |
|  | Arithmetic Average Roughness Ra (μm) | 0.05 | 0.05 | 0.04 | 0.04 |
|  | Close Adhesion with Tabular Base Material | ◎ | ◎ | ◎ | ◎ |

TABLE 3

|  |  | Example 10 | Example 11 | Example 12 | Example 13 | Example 14 |
|---|---|---|---|---|---|---|
|  | Base Material | Calcium Silicate Board | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate | Aliphatic Isocyanurate |
|  | Application Quantity | 20 g/m² | 20 g/m² | 20 g/m² | 20 g/m² | 20 g/m² |
| Evaluation | Light Resistance | ○ | ○ | ○ | ○ | ○ |
|  | Heat Resistance | ○ | ○ | ○ | ○ | ○ |
|  | Close Adhesion | ○ | ○ | ○ | ○ | ○ |
| Concealing Layer | Type | Aliphatic Isocyanate | Aliphatic Isocyanate | Aliphatic Isocyanate | Aliphatic Isocyanate | Aliphatic Isocyanate |
|  | Application Quantity | 30 g/m² | 30 g/m² | 30 g/m² | 30 g/m² | 30 g/m² |
| Evaluation | Light Resistance | ○ | ○ | ○ | ○ | ○ |
|  | Concealing Property | ○ | ○ | ○ | ○ | ○ |
|  | Coatability | ○ | ○ | ○ | ○ | ○ |
|  | Colorant Layer | Inkjet Printing | Inkjet Printing | Inkjet Printing | Inkjet Printing | Inkjet Printing |
| Topcoat Layer | Urethane Acrylate | 100 | 100 | 100 | 100 | 100 |
|  | Mono-Functional Acrylate | 58.3 | 53.8 | 100 | — | — |
|  | Bi-Functional Acrylate | — | — | — | 100 | — |
|  | Tri-Functional Acrylate | 58.3 | 53.8 | — | — | 100 |
|  | Total Monomer | 116.6 | 107.6 | 100 | 100 | 100 |
|  | Photopolymerization Initiator | 1.6 | 1.6 | 1.5 | 1.5 | 1.5 |
|  | Type of Photopolymerizaton Initiator | Irg. TPO | Irg. TPO | Irg. TPO | Irg. TPO | Irg. TPO |
|  | Application Quantity | 80 g/m² | 80 g/m² | 80 g/m² | 80 g/m² | 80 g/m² |
|  | Lamp Used | Metal Halide | Metal Halide | Metal Halide | Metal Halide | Metal Halide |
| Evaluation of Topcoat Layer | Close Adhesion with Concealing Layer | ○ | ○ | ○ | ○ | ○ |
|  | Heat Resistance | ○ | ○ | △ | △ | ○ |
| Evaluation of Decorative Board | Smoothness | ○ | ○ | ○ | ○ | ○ |
|  | Fire Resistance | ○ | ○ | ○ | ○ | ○ |
|  | Heat Resistance | ○ | ○ | ○ | ○ | ○ |
|  | Light Resistance | ○ | ○ | ○ | ○ | ○ |
|  | Wear Resistance (times) | 224 | 222 | 210 | 211 | 219 |
|  | Arithmetic Average Roughness Ra (μm) | 0.04 | 0.04 | 0.04 | 0.04 | 0.04 |
|  | Close Adhesion with Tabular Base Material | ◎ | ◎ | ◎ | ◎ | ◎ |

TABLE 4

|  |  | Example 15 | Example 16 | Example 17 | Example 18 |
|---|---|---|---|---|---|
| Base Material |  | Calcium Silicate Board | MDF | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate |
|  | Application Quantity | 20 g/m² | 20 g/m² | 20 g/m² | 20 g/m² |
| Evaluation | Light Resistance | ○ | ○ | ○ | ○ |
|  | Heat Resistance | ○ | ○ | ○ | ○ |
|  | Close Adhesion | ○ | ○ | ○ | ○ |
| Concealing Layer | Type | Aliphatic Isocyanate | Aliphatic Isocyanate | Aliphatic Isocyanate | Aliphatic Isocyanate |
|  | Application Quantity | 30 g/m² | 30 g/m² | 30 g/m² | 30 g/m² |
| Evaluation | Light Resistance | ○ | ○ | ○ | ○ |
|  | Concealing Property | ○ | Δ | ○ | ○ |
|  | Coatability | ○ | ○ | ○ | ○ |
| Colorant Layer |  | Transfer Film | Inkjet Printing | Inkjet Printing | Inkjet Printing |
| Topcoat Layer | Urethane Acrylate | 100 | 100 | 100 | 100 |
|  | Mono-Functional Acrylate | 42.9 | 42.9 | 42.9 | 42.9 |
|  | Bi-Funcional Acrylate | — | — | — | — |
|  | Tri-Functional Acrylate | 42.9 | 42.9 | 42.9 | 42.9 |
|  | Total Monomer | 85.8 | 85.8 | 85.8 | 85.8 |
|  | Photopolymerization Initiator | 1.4 | 1.4 | 1.4 | 1.4 |
|  | Type of Photopolymerization Initiator | Irg. TPO | Irg. TPO | Irg. TPO | Irg. TPO |
|  | Application Quantity | 80 g/m² | 80 g/m² | 80 g/m² | 80 g/m² |
| Lamp Used |  | Metal Halide | Metal Halide | Metal Halide | Metal Halide |
| Evaluation of Topcoat Layer | Close Adhesion with Concealing Layer | ○ | ○ | ○ | ○ |
|  | Heat Resistance | ○ | ○ | ○ | ○ |
| Evaluation of Decorative Board | Smoothness | ○ | ○ | ○ | ○ |
|  | Fire Resistance | ○ | — | ○ | ○ |
|  | Heat Resistance | ○ | ○ | ○ | ○ |
|  | Light Resistance | ○ | ○ | ○ | ○ |
|  | Wear Resistance (times) | 210 | 220 | 201 | 221 |
|  | Arithmetic Average Roughness Ra (μm) | 0.05 | 0.04 | 0.05 | 0.05 |
|  | Close Adhesion with Tabular Base Material | ⊚ | ⊚ | ⊚ | ⊚ |

TABLE 5

|  |  | Example 19 | Example 20 | Example 21 | Example 22 | Example 23 |
|---|---|---|---|---|---|---|
|  | Base Material | Calcium Silicate Board | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate | Aliphatic Isocyanurate |
|  | Application Quantity | 20 g/m² | 20 g/m² | 20 g/m² | 20 g/m² | 20 g/m² |
| Evaluation | Light Resistance | ○ | ○ | ○ | ○ | ○ |
|  | Heat Resistance | ○ | ○ | ○ | ○ | ○ |
|  | Close Adhesion | ○ | ○ | ○ | ○ | ○ |
| Concealing Layer | Type | Aliphatic Isocyanate | Aliphatic Isocyanate | Aliphatic Isocyanate | Aliphatic Isocyanate | Aliphatic Isocyanate |
|  | Application Quantity | 30 g/m² | 30 g/m² | 30 g/m² | 30 g/m² | 30 g/m² |
| Evaluation | Light Resistance | ○ | ○ | ○ | ○ | ○ |
|  | Concealing Property | ○ | ○ | ○ | ○ | ○ |
|  | Coatability | ○ | ○ | ○ | ○ | ○ |
|  | Colorant Layer | Inkjet Printing | Inkjet Printing | Inkjet Printing | Inkjet Printing | Inkjet Printing |
| Topcoat Layer | Urethane Acrylate | 100 | 100 | 100 | 100 | 100 |
|  | Mono-Functional Acrylate | 42.9 | 42.9 | — | — | 42.9 |
|  | Bi-Functional Acrylate | — | — | 42.9 | 42.9 | — |
|  | Tri-Functional Acrylate | 42.9 | 42.9 | 42.9 | 42.9 | 42.9 |
|  | Total Monomer | 85.8 | 85.8 | 85.8 | 85.8 | 85.8 |
|  | Photopolymerization Initiator | 1.4 | 1.4 | 1.4 | 1.4 | 1.4 |
|  | Type of Photopolymerizaton Initiator | Irg. TPO | Irg. TPO | Irg. TPO | Irg. TPO | Irg. TPO |
|  | Application Quantity | 80 g/m² | 80 g/m² | 80 g/m² | 80 g/m² | 80 g/m² |

TABLE 5-continued

|  |  | Example 19 | Example 20 | Example 21 | Example 22 | Example 23 |
|---|---|---|---|---|---|---|
|  | Lamp Used | Metal Halide | Metal Halide | Metal Halide | Metal Halide | Metal Halide |
| Evaluation of Topcoat Layer | Close Adhesion with Concealing Layer | ○ | ○ | ○ | ○ | ○ |
|  | Heat Resistance | ○ | ○ | ○ | ○ | ○ |
| Evaluation of Decorative Board | Smoothness | ○ | ○ | ○ | ○ | ○ |
|  | Fire Resistance | ○ | ○ | ○ | ○ | ○ |
|  | Heat Resistance | ○ | ○ | ○ | ○ | ○ |
|  | Light Resistance | ○ | ○ | ○ | ○ | ○ |
|  | Wear Resistance (times) | 215 | 210 | 221 | 209 | 205 |
|  | Arithmetic Average Roughness Ra (μm) | 0.04 | 0.05 | 0.04 | 0.04 | 0.04 |
|  | Close Adhesion with Tabular Base Material | ◎ | ◎ | ◎ | ◎ | ◎ |

TABLE 6

|  |  | Example 24 | Example 25 | Example 26 | Example 27 |
|---|---|---|---|---|---|
| Base Material |  | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate |
|  | Application Quantity | 20 g/m² | 20 g/m² | 20 g/m² | 20 g/m² |
| Evaluation | Light Resistance | ○ | ○ | ○ | ○ |
|  | Heat Resistance | ○ | ○ | ○ | ○ |
|  | Close Adhesion | ○ | ○ | ○ | ○ |
| Concealing Layer | Type | Aliphatic Isocyanate | Aliphatic Isocyanate | Aliphatic Isocyanate | Aliphatic Isocyanate |
|  | Application Quantity | 30 g/m² | 30 g/m² | 30 g/m² | 30 g/m² |
| Evaluation | Light Resistance | ○ | ○ | ○ | ○ |
|  | Concealing Property | ○ | ○ | ○ | ○ |
|  | Coatability | ○ | ○ | ○ | ○ |
| Colorant Layer |  | Inkjet Printing | Inkjet Printing | Inkjet Printing | Inkjet Printing |
| Topcoat Layer | Urethane Acrylate | 100 | 100 | 100 | 100 |
|  | Mono-Functional Acrylate | 42.9 | 8.3 | 42.9 | 42.9 |
|  | Bi-Functional Acrylate | — | — | — | — |
|  | Tri-Functional Acrylate | 42.9 | 50 | 42.9 | 42.9 |
|  | Total Monomer | 85.8 | 83.3 | 85.8 | 85.8 |
|  | Photopolymerization Initiator | 1.4 | 1.6 | 1.4 | 1.4 |
|  | Type of Photopolymerization Initiator | Irg. TPO | Irg. TPO | Irg. TPO | Irg. TPO |
|  | Application Quantity | 80 g/m² | 80 g/m² | 150 g/m² | 65 g/m² |
| Lamp Used |  | Metal Halide | Metal Halide | Metal Halide | Metal Halide |
| Evaluation of Topcoat Layer | Close Adhesion with Concealing Layer | ○ | ○ | ○ | ○ |
|  | Heat Resistance | ○ | ○ | ○ | ○ |
| Evaluation of Decorative Board | Smoothness | ○ | ○ | ○ | ○ |
|  | Fire Resistance | ○ | ○ | ○ | ○ |
|  | Heat Resistance | ○ | ○ | ○ | ○ |
|  | Light Resistance | ○ | ○ | ○ | ○ |
|  | Wear Resistance (times) | 205 | 355 | 366 | 201 |
|  | Arithmetic Average Roughness Ra (μm) | 0.05 | 0.04 | 0.05 | 0.04 |
|  | Close Adhesion with Tabular Base Material | ◎ | ◎ | ◎ | ◎ |

TABLE 7

| | | Example 28 | Example 29 | Example 30 | Example 31 | Example 32 | Example 32 |
|---|---|---|---|---|---|---|---|
| Primer Layer | Base Material | Calcium Silicate Board | Calcium Silicate Board | Calcium Silicate Board | Calcium Silicate Board | Calcium Silicate Board | Calcium Silicate Board |
| | Type | Aliphatic Isocyanurate | Aliphatic Isocyanurate | Aliphatic Isocyanurate | Aliphatic Isocyanurate | Aliphatic Isocyanurate | Aliphatic Isocyanurate |
| | Application Quantity | 20 g/m² | 20 g/m² | 20 g/m² | 20 g/m² | 20 g/m² | 20 g/m² |
| Evaluation | Light Resistance | ○ | ○ | ○ | ○ | ○ | ○ |
| | Heat Resistance | ○ | ○ | ○ | ○ | ○ | ○ |
| | Close Adhesion | ○ | ○ | ○ | ○ | ○ | ○ |
| Concealing Layer | Type | Aliphatic Isocyanate | Aliphatic Isocyanate | Aliphatic Isocyanate | Aliphatic Isocyanate | Aliphatic Isocyanate | Aliphatic Isocyanate |
| | Application Quantity | 30 g/m² | 30 g/m² | 30 g/m² | 30 g/m² | 30 g/m² | 30 g/m² |
| Evaluation | Light Resistance | ○ | ○ | ○ | ○ | ○ | ○ |
| | Concealing Property | ○ | ○ | ○ | ○ | ○ | ○ |
| | Coatability | ○ | ○ | ○ | ○ | ○ | ○ |
| Colorant Layer | | Inkjet Printing | Inkjet Printing | Inkjet Printing | Inkjet Printing | Inkjet Printing | Inkjet Printing |
| Topcoat Layer | Urethane Acrylate | 100 | 100 | 100 | 100 | 100 | 100 |
| | Mono-Functional Acrylate | 42.9 | 42.9 | 8.3 | — | 42.9 | 42.9 |
| | Bi-Functional Acrylate | — | — | 25 | — | — | — |
| | Tri-Functional Acrylate | 42.9 | 42.9 | 50 | 42.9 | 42.9 | 42.9 |
| | Total Monomer | 85.8 | 85.8 | 83.3 | 0 | 85.7 | 85.7 |
| | Photopolymerization Initiator | 1.4 | 1.4 | 1.6 | 1.4 | 1.4 | 1.4 |
| | Type of Photopolymerization Initiator | Irg, 184 | Irg, 819 | Irg, TPO | Irg, TPO | Irg, TPO | Irg, TPO |
| | Application Quantity | 80 g/m² | 80 g/m² | 80 g/m² | 80 g/m² | 80 g/m² | 80 g/m² |
| | Lamp Used | Metal Halide | Metal Halide | LED Lamp | Metal Halide | Metal Halide | Metal Halide |
| Evaluation of Topcoat Layer | Close Adhesion with Concealing Layer | ○ | ○ | ○ | ○ | ○ | ○ |
| | Heat Resistance | ○ | ○ | ○ | ○ | ○ | ○ |
| Evaluation of Decorative Board | Smoothness | ○ | ○ | ○ | △ | ○ | ○ |
| | Fire Resistance | ○ | ○ | ○ | ○ | ○ | ○ |
| | Heat Resistance | ○ | ○ | ○ | ○ | ○ | ○ |
| | Light Resistance | ○ | ○ | ○ | ○ | ○ | ○ |
| | Wear Resistance (times) | 200 | 232 | 296 | 211 | 239 | 255 |
| | Arithmetic Average Roughness Ra (μm) | 0.04 | 0.04 | 0.04 | 0.09 | 0.04 | 0.04 |
| | Close Adhesion with Tabular Base Material | ◎ | ◎ | ◎ | ◎ | ○ | ○ |

Irg.184 and Irg.819 in Table 7 respectively stand for IRGACURE 184 and IRGACURE 819.

TABLE 8

| | | Comparative Example 1 | Comparative Example 2 | Comparative Example 3 | Comparative Example 4 | Comparative Example 5 | Comparative Example 6 |
|---|---|---|---|---|---|---|---|
| | Base Material | Calcium Silicate Board | Calcium Silicate Board | Calcium Silicate Board | Calcium Silicate Board | Calcium Silicate Board | Calcium Silicate Board |
| Primer Layer | Type | Aliphatic Isocyanurate | Aliphatic Isocyanurate | Aliphatic Isocyanurate | Aliphatic Isocyanurate | — | Aliphatic Isocyanurate |
| | Application Quantity | 20 g/m² | 20 g/m² | 20 g/m² | 20 g/m² | — | 20 g/m² |
| Evaluation | Light Resistance | X | ○ | ○ | ○ | — | ○ |
| | Heat Resistance | X | ○ | ○ | ○ | — | ○ |
| | Close Adhesion | — | ○ | ○ | ○ | — | ○ |
| Concealing Layer | Type | — | Aliphatic Isocyanate | Aliphatic Isocyanate | Aliphatic Isocyanate | Aliphatic Isocyanate | — |
| | Application Quantity | — | 30 g/m² | 30 g/m² | 30 g/m² | 30 g/m² | — |
| Evaluation | Light Resistance | — | X | ○ | ○ | ○ | — |
| | Concealing Property | — | X | ○ | ○ | ○ | — |
| | Coatability | — | ○ | ○ | ○ | ○ | — |
| | Colorant Layer | — | — | Printed Paper (40 g/m²) | Printed Paper (100 g/m²) | Inkjet Printing | Inkjet Printing |
| Topcoat Layer | Urethane Acrylate | — | — | 100 | 100 | 100 | 100 |
| | Mono-Functional Acrylate | — | — | 42.9 | 42.9 | 42.9 | 42.9 |
| | Bi-Functional Acrylate | — | — | — | — | — | — |
| | Tri-Functional Acrylate | — | — | 42.9 | 42.9 | 42.9 | 42.9 |
| | Total Monomer | — | — | 85.7 | 85.7 | 85.7 | 85.7 |
| | Photopolymerization Initiator | — | — | 1.4 | 1.4 | 1.4 | 1.4 |
| | Type of Photopolymerizaton Initiator | — | — | Irg, TPO | Irg, TPO | Irg, TPO | Irg, TPO |
| | Application Quantity | — | — | 80 g/m² | 80 g/m² | 80 g/m² | 80 g/m² |
| | Lamp Used | — | — | Metal Halide | Metal Halide | Metal Halide | Metal Halide |
| Evaluation of Topcoat Layer Close Adhesion with Concealing Layer | | — | — | ○ | X | X | — |
| | Heat Resistance | — | — | X | — | ○ | ○ |
| Evaluation of Composite Board | Smoothness | — | — | ○ | — | ○ | X |
| | Fire Resistance | — | — | X | — | X | X |
| | Heat Resistance | — | — | X | — | ○ | ○ |
| | Light Resistance | — | — | ○ | — | ○ | ○ |
| | Wear Resistance (times) | — | — | 220 | — | 239 | 237 |
| | Arithmetic Average Roughness Ra (μm) | — | — | 0.39 | — | 0.49 | 0.23 |
| | Close Adhesion with Tabular Base Material | — | — | — | — | X | — |

Evaluation methods are as follows.

Evaluation of Primer Layer (1) Light Resistance

The base material with the primer layer applied thereon was irradiated with ultraviolet ray for 48 hours by using a super accelerated weathering tester EYE Super UV Tester (manufactured by Iwasaki Electric Co., Ltd.). By visual observation before and after the test, a mark ○ was given when no discoloration of the primer layer were observed. A mark X was given when discoloration of the primer layer was observed.

(2) Heat Resistance

The base material with the primer layer applied thereon was cured in a thermostatic bath at 105° C. for 24 hours. By visual observation before and after the test, a mark ○ was given when no discoloration of the primer layer were observed. A mark X was given when discoloration of the primer layer was observed.

(3) Close Adhesion

The primer layer and the concealing layer were applied on the base material, then a gummed paper tape was attached on a surface layer and forcibly stripped. A mark ○ was given when the concealing layer was not separated from the base material. A mark X was given when the concealing layer was separated from the base material.

Evaluation of Concealing Layer (1) Light Resistance

The base material with the concealing layer applied thereon was irradiated with ultraviolet ray for 48 hours by using the super accelerated weathering tester EYE Super UV Tester (manufactured by Iwasaki Electric Co., Ltd.). By visual observation before and after the test, a mark ○ was given when no discoloration of the concealing layer were observed. A mark X was given when discoloration of the concealing layer was observed.

(2) Concealing Property

The concealing layer was applied on the base material. A mark ○ was given when the color or coloring unevenness of the underlying base material was not observed through the concealing layer. A mark X was given when coloring unevenness of the underlying base material was observed.

(3) Coatability

The concealing layer was applied on the base material. A mark ○ was given when there were no waviness, streaks, or uncoated spots on the appearance of the concealing layer.

Evaluation of Topcoat Layer (1) Close Adhesion with Concealing Layer

A gummed paper tape was attached on the surface layer of the decorative board and forcibly stripped. A mark ○ was given when there were no separations in the concealing layer or in other layers. A mark X was given when there was a separation in the concealing layer or in other layers.

(2) Heat Resistance

A test piece was formed by applying 80 g/m$^2$ of ultraviolet-curable resin alone in solid content (conversion to dried film thickness: 80 μm) as a topcoat layer on a 6 mm-thick calcium silicate board and irradiating the resulting piece with ultraviolet ray using the metal halide lamp so that the irradiation intensity is 450 mJ/cm$^2$. The test piece was cured in a thermostatic bath at 105° C. for 24 hours. By visual observation before and after the test, a mark ○ was given when discoloration of the ultraviolet-curable resin layer was not observed or no cracks were observed on the ultraviolet-curable resin layer. A mark Δ was given when minor discoloration or minor cracks were observed but had no effects on the appearance of the test piece.

Evaluation of Decorative Board (1) Smoothness

A mark ○ was given when there were no waviness, foaming, and poor hardening of resin in the appearance of the decorative board. A mark Δ was given when orange peel appearance was observed in several places on the decorative board. A mark X was given when the decorative board was not formed with smoothness.

Figure 3:
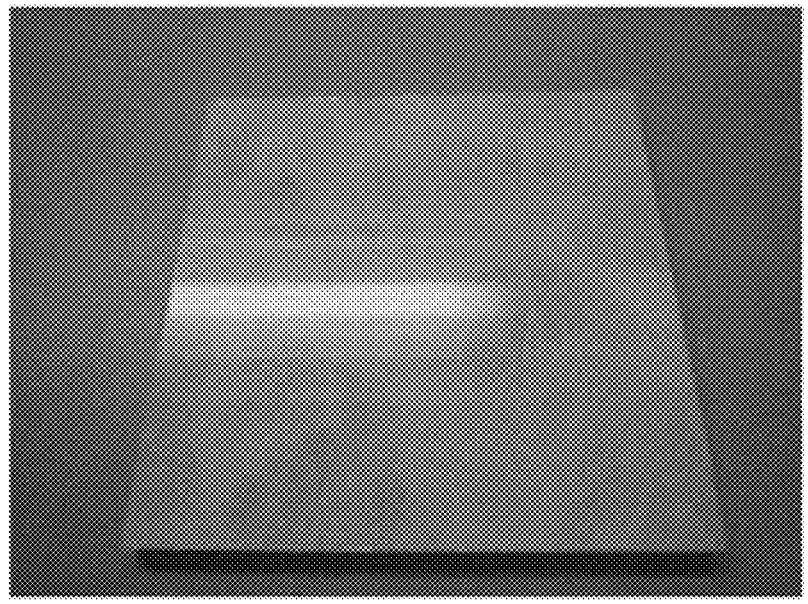
FIG. 3 is a photograph of the decorative board in Example 1, taken with light of a rod-shaped fluorescent lamp projected on the decorative board.
Figure 4:
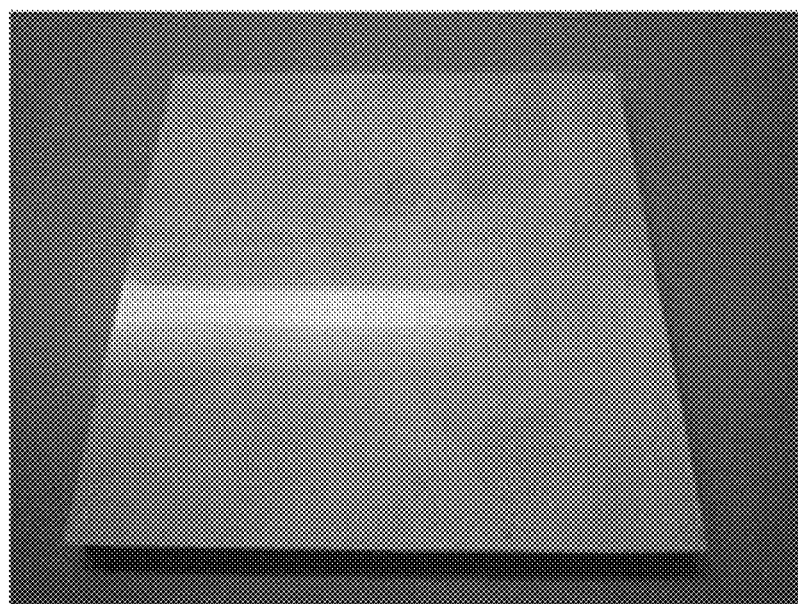
FIG. 4 is a photograph of a decorative board in Example 31 (evaluated as Δ in smoothness of a formed product), taken with light of a rod-shaped fluorescent lamp projected on the decorative board.
Figure 5:
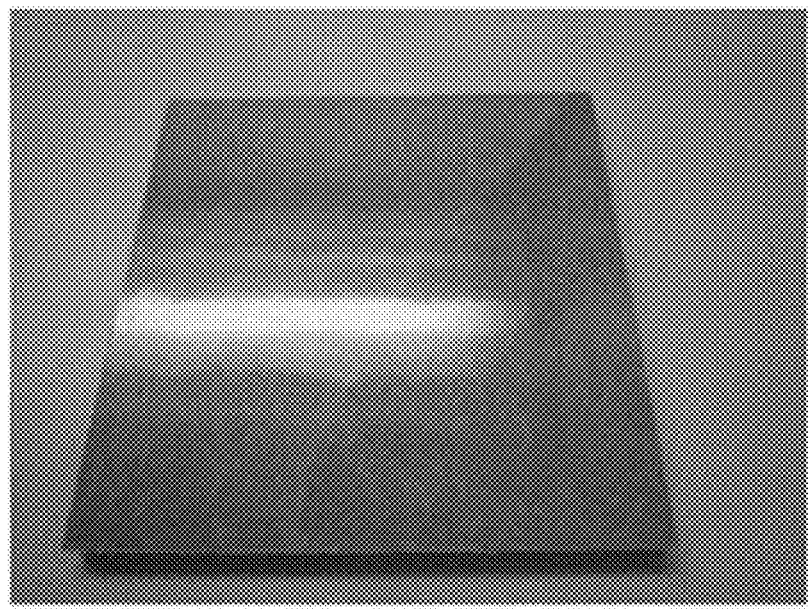
FIG. 5 is a photograph of a composite board in Comparative Example 3 (evaluated as X in smoothness of a formed product), taken with light of a rod-shaped fluorescent lamp projected on the composite board.

A light from a rod-shaped fluorescent lamp was projected on the decorative boards of Example 1 and Example 31, and the composite board of Comparative Example 3, and photographs of the decorative boards and composite board were taken during the projection. FIG. 3 shows a photograph of the decorative board in Example 1; FIG. 4 shows a photograph of the decorative board in Example 31; and FIG. 5 shows a photograph of the composite board of Comparative Example 3. The surface of the decorative board in Example 1 had high smoothness, and thus faithfully reflected the shape of the fluorescent lamp. In contrast, the surface of the composite board of Comparative Example 3 had low smoothness, and thus the reflected shape of the fluorescent lamp was blurry.

(2) Fire Resistance

A 20-minute heat release test with a cone calorimeter conforming to ISO5660 was performed on the decorative board. A mark ○ was given when the total heat release was 8 MJ/m$^2$ or less, the maximum heat release rate did not exceed 200 kW/m$^2$ continuously for 10 seconds or more, and no breakages or fractures or the like penetrating to a rear face of the tested specimen were observed (shape of the tested specimen was retained). A mark X was given when the total heat release exceeded 8 MJ/m$^2$.

(3) Heat Resistance

A heat resistance test conforming to JIS K 6902 "Testing method for laminated thermosetting resin high-pressure decorative sheets: 2007" was performed on the decorative board. A mark ○ was given when the tested decorative board showed no abnormalities; a mark X was given when an abnormality was observed.

(4) Light Resistance

A light resistance test conforming to JIS K 6902 "Testing method for laminated thermosetting resin high-pressure decorative sheets: 2007" was performed on the decorative board. A mark ○ was given when the tested decorative board showed no abnormalities; a mark X was given when an abnormality was observed.

(5) Wear Resistance

A wear resistance test conforming to JIS K 6902 "Testing method for laminated thermosetting resin high-pressure decorative sheets: 2007" was performed on the decorative board.

(6) Arithmetic Average Roughness Ra

Arithmetic average roughness Ra of the decorative board was measured in accordance with JIS B 0601: 2001 "Geometrical Product Specifications (GPS)-Surface texture: Profile method-Terms, definitions and surface texture parameters" by using a surface roughness and contour profile measuring machine (SURFCOM FLEX; TOKYO SEIMITSU CO., LED.). The lower the value is, the smoother the surface is and the lower the effect of unevenness on the underlying base material is. The unit of the value is μm.

(7) Close Adhesion with Tabular Base Material

In accordance with JIS K 5600-5-6 "Testing methods for paints—Part 5: Mechanical property of film—Section 6: Adhesion test (Cross-cut test)", six grids of 1 mm with a depth reaching the tabular base material were made on the surface of the decorative board, a cellophane tape was attached on the grids and swiftly stripped at 90 degree angle, and the tested grids were observed. A mark ⊚ was given when all of the six grids had no abnormalities; a mark ○ was given when all of the six grids had no abnormalities but had a minor flaw with no more than a partial separation. The decorative boards in Examples 1 to 33 were evaluated as fair in all of the evaluation items.

The topcoat layers in Examples 12 and 13 were given Δ in heat resistance. The reason for this result is assumed that these topcoat layers had a little effect as crosslinking agents for monomers with a small number of functional groups.

The concealing layer of the decorative board in Example 16 was given Δ in concealing property. This is assumed to be due to the thick color of the MDF base material compared to the colors of the base materials in other examples.

The wear resistance of the decorative board in Examples 25, 26, and 30 were higher than that in Examples 1 to 24, 27 to 29, and 31. With respect to Example 25, the reason is assumed to be the increased strength of the topcoat layer as the topcoat layer contained urethane acrylate, mono-functional acrylate, bi-functional acrylate, and tri-functional acrylate. With respect to Example 26, the reason is assumed to be the increased thickness of the topcoat layer caused by a large application quantity of the topcoat layer. With respect to Example 30, the reason is assumed to be the increased strength of the topcoat layer as the topcoat layer contained urethane acrylate, mono-functional acrylate, bi-functional acrylate, and tri-functional acrylate, and the increased hardness of the topcoat layer as the LED lamp, which had high irradiation energy, was used.

The smoothness of the decorative board in Example 31 was given Δ. The reason for this is assumed to be that the topcoat layer did not contain monomer.

Examples 32 and 33 include a decorative board using chloroprene based rubber and acrylic styrene based resin as the primer layer. The close adhesion of the base material with the primer layer in both examples was fair, however, very slightly lower than that of Examples 1 to 31, where aliphatic isocyanurate were used In the composite boards of Comparative Examples 3 and 4, decorative papers were used in place of the colorant layer. The composite board of Comparative Example 3 was also evaluated low in the smoothness and the fire resistance. The basis weight of decorative paper in Comparative Example 4 was greater than the basis weight of the decorative paper in Comparative Example 3. This led to separation in a portion where the printed paper was disposed after forming, and therefore the composite board could not be manufactured.

The smoothness of the composite board of Comparative Example 5 was poor. As the composite board of Comparative Example 5 had no primer layer, unevenness of the base material could not be absorbed by the concealing layer alone and appeared on the surface of the composite board. In Comparative Example 5, the close adhesion of the base material with the concealing layer, and of the topcoat layer with the concealing layer were also poor.

The smoothness of the composite board of Comparative Example 6 was poor. As the composite board of Comparative Example 6 had no concealing layer, unevenness of the base material could not be absorbed by the primer layer alone and appeared on the surface of the composite board.

The invention claimed is:

1. A decorative board comprising:
a primer layer;
a concealing layer;
a colorant layer; and
a topcoat layer containing ultraviolet-curable resin, arranged on a base material in this order,
wherein the primer layer includes hexamethylene diisocyanate (HDI) based aliphatic isocyanurate,
wherein the concealing layer includes one component moisture-curable urethane resin that contains HDI based aliphatic isocyanate, and
wherein the ultraviolet-curable resin of the topcoat layer includes urethane (meth)acrylate and at least one (meth)acrylate selected from: mono-functional (meth)acrylate, bi-functional (meth)acrylate, and tri-functional (meth)acrylate.

2. The decorative board according to claim 1, wherein the colorant layer is an inkjet print layer.

3. The decorative board according to claim 1, wherein the colorant layer is a transfer layer.

4. The decorative board according to claim 1, wherein the colorant layer contains ultraviolet-curable ink.

5. The decorative board according to claim 1, wherein the base material is an inorganic base material.

6. The decorative board according to claim 5, wherein the inorganic base material is a calcium silicate board.

7. The decorative board according to claim 1, wherein the concealing layer contains titanium oxide.

8. The decorative board according to claim 1, wherein the at least one (meth)acrylate included in the ultraviolet-curable resin in the topcoat layer includes at least two of mono-functional (meth)acrylate, bi-functional (meth)acrylate, and tri-functional (meth)acrylate.

9. The decorative board according to claim 1, wherein the at least one (meth)acrylate included in the ultraviolet-curable resin in the topcoat layer includes each of mono-functional (meth)acrylate, bi-functional (meth)acrylate, and tri-functional (meth)acrylate.

10. The decorative board according to claim 1, wherein the urethane (meth)acrylate included in the ultraviolet-curable resin in the topcoat layer includes bi-functional urethane (meth)acrylate or tri-functional urethane (meth)acrylate.

11. The decorative board according to claim 1, wherein the ultraviolet-curable resin in the topcoat layer includes tri-functional urethane acrylate and at least one (meth)acrylate selected from mono-functional (meth)acrylate, bi-functional (meth)acrylate, and tri-functional (meth)acrylate.

12. The decorative board according to claim 1,
wherein the decorative board contains 5 to 100 parts by weight of mono-functional (meth)acrylate; 20 to 110 parts by weight of bi-functional (meth)acrylate; and 30 to 110 parts by weight of tri-functional (meth)acrylate with respect to 100 parts by weight of the urethane (meth)acrylate included in the ultraviolet-curable resin in the topcoat layer.

13. The decorative board according to claim 1, wherein an elongation of the urethane (meth)acrylate included in the ultraviolet-curable resin in the topcoat layer is 3% to 10%.

14. A decorative board comprising:
a primer layer;
a concealing layer;
a colorant layer; and
a topcoat layer containing ultraviolet-curable resin, arranged on a base material in this order,
wherein the primer layer includes aliphatic isocyanurate,
wherein the concealing layer includes one component moisture-curable urethane resin,
wherein the ultraviolet-curable resin of the topcoat layer includes urethane (meth)acrylate and at least one (meth)acrylate selected from: mono-functional (meth) acrylate, bi-functional (meth)acrylate, and tri-functional (meth)acrylate, and wherein the decorative board contains 5 to 100 parts by weight of mono-functional (meth)acrylate; 20 to 110 parts by weight of bi-functional (meth)acrylate; and 30 to 110 parts by weight of tri-functional (meth)acrylate with respect to 100 parts by weight of the urethane (meth)acrylate included in the ultraviolet-curable resin in the topcoat layer.

15. The decorative board according to claim 14, wherein the urethane (meth)acrylate included in the ultraviolet-curable resin in the topcoat layer includes bi-functional urethane (meth)acrylate or tri-functional urethane (meth)acrylate.

16. The decorative board according to claim 14, wherein an elongation of the urethane (meth)acrylate included in the ultraviolet-curable resin in the topcoat layer is 3% to 10%.

\* \* \* \* \*